United States Patent
Pegushin et al.

(10) Patent No.: US 9,183,109 B2
(45) Date of Patent: Nov. 10, 2015

(54) METHOD AND SYSTEM FOR ANALYZING THE PERFORMANCE OF MULTI-THREADED APPLICATIONS

(75) Inventors: Anton Pegushin, Nizhny Novgorod (RU); Alexandr Kurylev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 473 days.

(21) Appl. No.: 12/787,240

(22) Filed: May 25, 2010

(65) Prior Publication Data

US 2011/0296420 A1 Dec. 1, 2011

(51) Int. Cl.
*G06F 9/46* (2006.01)
*G06F 11/34* (2006.01)
*G06F 9/48* (2006.01)

(52) U.S. Cl.
CPC .......... *G06F 11/3404* (2013.01); *G06F 9/4881* (2013.01); *G06F 2201/86* (2013.01); *G06F 2201/88* (2013.01); *G06F 2201/885* (2013.01)

(58) Field of Classification Search
CPC ................................. G06F 9/52; G06F 9/4881
USPC ......................................................... 718/104
See application file for complete search history.

(56) References Cited

U.S. PATENT DOCUMENTS

| | | | | |
|---|---|---|---|---|
| 5,177,688 | A * | 1/1993 | Rentschler et al. | 700/101 |
| 5,692,174 | A * | 11/1997 | Bireley et al. | 1/1 |
| 5,777,882 | A * | 7/1998 | Salgado | 700/214 |
| 6,658,449 | B1 * | 12/2003 | Brenner et al. | 718/105 |
| 7,945,911 | B1 * | 5/2011 | Garthwaite | 718/102 |
| 8,196,146 | B2 | 6/2012 | Sakai | |
| 2002/0059544 | A1 | 5/2002 | Boucher et al. | |
| 2005/0240924 | A1 * | 10/2005 | Jones et al. | 718/100 |
| 2006/0053422 | A1 | 3/2006 | Alikacem et al. | |
| 2006/0150162 | A1 | 7/2006 | Mongkolsmai et al. | |
| 2007/0157177 | A1 | 7/2007 | Bouguet et al. | |
| 2010/0169566 | A1 * | 7/2010 | Ooi | 711/112 |

(Continued)

FOREIGN PATENT DOCUMENTS

| | | |
|---|---|---|
| JP | 2009-80583 | 4/2009 |
| WO | 2011149784 A2 | 1/2011 |
| WO | 2011149784 A3 | 4/2012 |

OTHER PUBLICATIONS

"OpenMP Application Program Interface," Version 3.0 OpenMP Architecture Review Board, May 2008, 326 pages.

(Continued)

*Primary Examiner* — Camquy Truong
(74) *Attorney, Agent, or Firm* — Schwabe, Williamson & Wyatt, P.C.

(57) ABSTRACT

A method and system to provide an analysis model to determine the specific problem(s) of a multi-threaded application. In one embodiment of the invention, the multi-thread application uses a plurality of threads for execution and each thread is assigned to a respective one of a plurality of states based on a current state of each thread. By doing so, the specific problem(s) of the multi-threaded application is determined based on the number of transitions among the plurality of states for each thread. In one embodiment of the invention, the analysis model uses worker threads transition counters or events to determine for each parallel region or algorithm of the multi-threaded application which problem has happened and how much it has affected the scalability of the parallel region or algorithm.

19 Claims, 6 Drawing Sheets

(56) References Cited

U.S. PATENT DOCUMENTS

2010/0223395 A1* 9/2010 Elliot et al. .................. 709/232
2011/0161964 A1* 6/2011 Piazza et al. .................. 718/102

OTHER PUBLICATIONS

International Search Report mailed Jan. 10, 2012 from International Application No. PCT/US2011/037403.

Office Action mailed Sep. 16, 2013 for Australian Application No. 2011258570, 3 pages.

Translation of Office Action mailed Jan. 14, 2014 for Japanese Application No. 2013-512102, 7 pages.

English Translation of XLsoft Corporation, Software development for multicore processors, SoftwareDesign, Gijutsu-Hyohron Co., Ltd., Apr. 20, 2010, May issue in 2010, No. 235, pp. 200-206 (CS-ND-2010-00241-006), 16 pages.

English Translation of Steve Kleiman, et al., "Practice of multithread programming", ASCII, Co., Ltd., Mar. 11, 1998, first edition, pp. 305-309 (CS-NB-2000-00266-001), 20 pages.

English Translation of Kenjiro Taura, "Techniques for Programming Languages that Support Fine-Grain Multithreading (1)", Computer Software, Japan Society for Software Science and Technology, Mar. 15, 1999, vol. 16, No. 2, pp. 1-18 (CS-ND-2000-00266-001), 24 pages.

English Translation of Office Action mailed Mar. 12, 2014 for Korean Application No. 2012-7030784, 3 pages.

International Preliminary Report on Patentability mailed Dec. 6, 2012 for PCT Application No. PCT/US2011/037403, 7 pages.

Office Action mailed Jan. 6, 2015 for Chinese Application No. 201180028522.7, 18 pages.

Office Action mailed Nov. 11, 2014 for Japanese Application No. 2013-512102, 8 pages.

* cited by examiner

```
// TBB code of a parallel for-loop
element_t array[N];
size_t grain_size = 1;
tbb::parallel_for(tbb::blocked_range<size_t>(0, N, grain_size), [&array](const tbb::blocked_range<size_t>& r)
{
    for(size_t i = r.begin(); i < r.end(); ++i)
    {
        foo(array[i]);
    }
}, simple_partitioner());
```

```
// OpenMP parallel for-loop with dynamic scheduling
element_t array[N];
#pragma omp parallel for schedule(dynamic, 3)
for(size_t i = 0; i < N; ++i)
{
    foo(array[i]);
}
```

```
// TBB code spawning work-tasks from one thread only.
element_t array[N];
tbb::task_group tg;
for(size_t i = 0; i < N; ++i)
{
    tg.run([&array, i] () { foo(array[i]); });
}
```

METHOD AND SYSTEM FOR ANALYZING THE PERFORMANCE OF MULTI-THREADED APPLICATIONS

FIELD OF THE INVENTION

This invention relates to a multi-threaded application, and more specifically but not exclusively, to an analysis model to determine specific problems of the multi-threaded application that uses a multi-threading framework.

BACKGROUND DESCRIPTION

Multi-threading frameworks, such as Open Multi-Processing (OpenMP), Intel® Threading Building Blocks (TBB), Intel® Cilk++, Intel® C++ for Throughput Computing (Ct), and Microsoft® Parallel Patterns Library (PPL) allow parallelism to improve the performance of a multi-threaded application. The advantage of the multi-threaded application can be observed on computer systems that have multiple central processing units (CPUs), or CPUs with multiple cores as each thread of the multi-thread application uses one of the CPUs/cores for concurrent execution.

However, if the multi-threaded framework is used incorrectly to execute the multi-threaded application, the advantage of parallelism may be compromised. FIG. 1A illustrates a prior-art code 100 of a parallel for-loop. The granularity of the function foo( ) is set as one. Depending on how long the function foo( ) takes to execute, the advantage of parallelism may be compromised as the granularity of one is too fine.

FIG. 1B illustrates a prior-art code 130 of a parallel for-loop with dynamic scheduling. The granularity of the function foo( ) is set as three. Dynamic scheduling requires distribution overheads and depending on how long the function foo( ) takes to execute, the advantage of parallelism may be compromised as the granularity of three is too fine.

FIG. 1C illustrates a prior-art code 150 of work tasks being spawn or created from only one thread. Depending on how large the variable N is set, the prior-art code 150 can have a linear spawning problem with significant active stealing overheads. For example, when the variable N is set to be more than 100, this execution scales much worse than another execution with recursive spawning.

The prior-art codes 100, 130, and 150 illustrate possible scenarios where the multi-threaded application can be used incorrectly or ineffectively.

BRIEF DESCRIPTION OF THE DRAWINGS

The features and advantages of embodiments of the invention will become apparent from the following detailed description of the subject matter in which:

FIG. 1A illustrates a prior-art code of a parallel for-loop;

FIG. 1B illustrates a prior-art code of a parallel for-loop with dynamic scheduling;

FIG. 1C illustrates a prior-art code of work tasks being spawn or created from only one thread;

DETAILED DESCRIPTION

Figure 2:
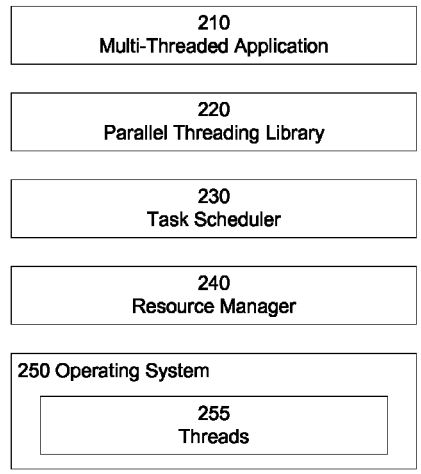
FIG. 2 illustrates the modules of a platform in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide an analysis model to determine the specific problem(s) of a multi-threaded application that uses a multi-threading framework. In one embodiment of the invention, the multi-thread application uses a plurality of threads for execution and each thread is assigned to a respective one of a plurality of states based on the current state of each thread. By doing so, the specific problem(s) of the multi-threaded application is determined based on the frequency of transitions among the plurality of states for each thread. In one embodiment of the invention, the analysis model uses worker threads transition counters or events to determine for each parallel region or algorithm of the multi-threaded application which problem has happened and how much it has affected the scalability of the parallel region or algorithm.

In one embodiment of the invention, the usage of the multi-threading framework or parallel threading library to execute a multi-threading application is ineffective or problematic if the performance benefit from the parallel execution of the multi-threading application is insignificant or unacceptable from a user's perspective. The performance benefit includes, but is not limited to, faster execution time, smaller number of CPU ticks, and the like. For example, in one embodiment of the invention, the usage of the multi-threading framework to execute a multi-threading application is ineffective when the parallel overheads to execute the multi-threading application are comparable to or more than the performance benefit from the parallel execution of the multi-threaded application.

FIG. 2 illustrates the modules of a platform 200 in accordance with one embodiment of the invention. The platform or system 200 has a plurality of processors and/or a multi-core processor(s) and the operating system (OS) 250 executes on at least one of the plurality of processors or on one of the cores of multi-core processor(s). The OS 250 has a pool of native threads 255 available to execute a multi-threading application 210 on the platform 200.

The resource manager 240 manages the pool of native threads 255 and controls the availability of the threads for execution. The task scheduler 230 schedules the tasks to be executed by the available threads from the pool of native threads 255. The parallel threading library 220 contains functions that can be referenced or used by a multi-threaded application 210 for parallel execution using the native threads 255.

In one embodiment of the invention, the multi-threaded application 210 uses a parallel threading library 220 or multi-threading framework that includes, but is not limited to, Open Multi-Processing (OpenMP), Intel® Threading Building Blocks (TBB), Intel® Cilk++, Intel® C++ for Throughput Computing (Ct), Microsoft® Parallel Patterns Library (PPL) and any other multi-threading frameworks.

In one embodiment of the invention, the parallel threading library 220 has logic to determine that the multi-threaded application 210 has a sub-optimal parallel algorithm and to determine one or more performance problems of the sub-optimal parallel algorithm using the analysis model. In another embodiment of the invention, the logic is part of the Intel® Parallel Amplifier software. In yet another embodiment of the invention, the logic can be part of any modules of the platform 200.

Although the modules of the platform 200 are depicted as separate blocks, the operations of one module may be performed by another module. For example, in one embodiment, the OS 250 can perform the functions of the resource manager 240. In another embodiment, the parallel threading library 220 may also be integrated with the OS 250. One of ordinary skill in the relevant art will readily appreciate different combinations of the modules or functions can be performed without affecting the workings of the invention.

Figure 3:
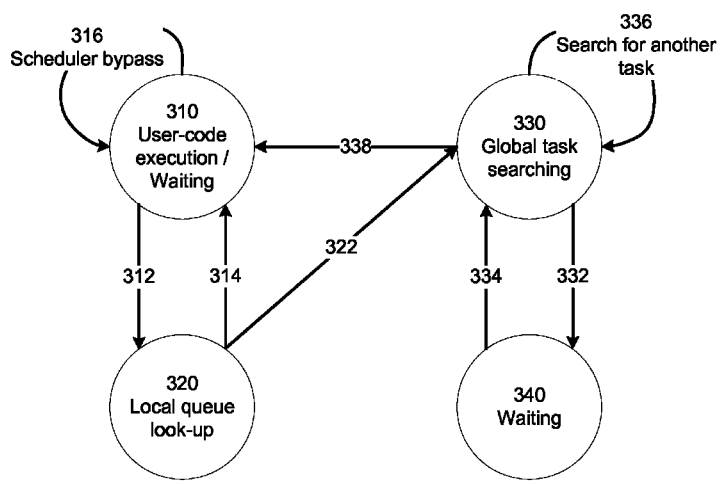
FIG. 3 illustrates an analysis model based on a worker thread lifecycle state machine in accordance with one embodiment of the invention.

FIG. 3 illustrates an analysis model 300 based on a worker thread lifecycle state machine in accordance with one embodiment of the invention. When a multi-threaded application is executed, parallel overheads are incurred or required in order to perform the parallel execution of the multi-threaded application. The parallel overheads include, but are not limited to, thread maintenance, job distribution among worker threads and the like. The parallel overheads are classified into active and inactive parallel overheads in one embodiment of the invention.

There are two scenarios where excessive active parallel overheads can affect the parallel execution of the multi-threaded application in one embodiment of the invention. The first scenario of active parallel overheads occurs when one or more worker threads spend too much of their lifetime taking job units or tasks out of their local queue. The first scenario is due to the granularity of the parallel region(s) of the multi-threaded application being set as a level that is too fine or too small. The second scenario of active parallel overheads occurs when one or more worker threads spend too much of their lifetime looking for tasks in other tasks queues or in a global job manager queue, i.e., the worker threads are stealing tasks from another source besides its own local queue.

Similarly, there are two scenarios where excessive inactive parallel overheads can affect the parallel execution of the multi-threaded application in one embodiment of the invention. The first scenario of inactive parallel overheads occurs when one or more worker threads become idle because they have finished their tasks but are unable to assist the rest of the worker threads that are still busy executing their tasks. The excessive waiting of the one or more worker threads causes the inactive parallel overheads.

The second scenario of inactive parallel overheads occurs when there is insufficient job or task creation to saturate or utilize all of the available worker threads. The worker threads are continuously transitioning from executing one task to searching for another task and entering into an idle state when there are no tasks available. When a new task is available, all the available threads become active again. The available threads that are not assigned with the new task reiterate the continuous transition to search for another task and entering into an idle state when there are no tasks available.

The four scenarios of active and inactive parallel overheads are identified during the execution of a parallel region of a multi-threaded application using the analysis model 300 in one embodiment of the invention. One or more of the four scenarios of active and inactive parallel overheads can occur within a parallel region of a multi-threading application. The analysis model 300 has a worker thread lifecycle state machine that has four states that describe the current state of a worker thread. Each worker thread is assigned to one of the four states during its lifetime.

The first state is a user-code execution state 310, where each thread is assigned to the user-code execution state 310 when it is in a current state to execute part of the parallel region of the multi-threaded application. When a scheduler bypass 316 is performed, the worker thread remains in the user-code execution state 310. Ideally each worker thread should remain in the user-code execution state 310 to minimize the active and inactive parallel overheads.

The second state is a local queue look-up state 320, where each thread is assigned to the local queue look-up state 320 when it is in a current state to search for a job or task in its local queue. Each thread enters the local queue look-up state 320 after it finishes its current task and seeks for a new task in its local queue of tasks.

The third state is a global task searching state 330, where each thread is assigned to the global task searching state 330 when it is in a current state to search for a task in another task queue or in the global queue. Each thread enters the global task searching state 330 when it is unable to find a task in its local queue during the local queue look-up state 320.

The fourth state is a waiting state 340, where each thread is assigned to the waiting state 340 when it is in a current state of inactivity or idle state. Each thread enters the waiting state 340 as it is unable to find a task during the global task searching state 330. When a new task becomes available, each thread in the waiting state 340 goes back to the global task searching state 330 to look for the new task. The state transition paths 312, 314, 316, 322, 332, 334, 336, and 338 show the state transitions of each thread among the four states of the analysis model 300.

In one embodiment of the invention, the number of state transitions among the four states of the analysis model 300 of each thread is measured or calculated during the execution of a parallel region of the multi-threaded application. In one embodiment of the invention, the entire multi-threaded application is executed to determine the number of state transitions among the four states of the analysis model 300 of each thread. In another embodiment of the invention, only a part of the multi-threaded application is executed to determine the number of state transitions among the four states of the analysis model 300 of each thread. The part of the multi-threaded application to be executed is based on, but not limited to, a measurement period, a percentage of the total run-time of the multi-threaded application and the like.

To identify which of the four scenarios of active and inactive parallel overheads exist during the execution of a parallel region of a multi-threaded application, the measured number of state transitions among the four states of the analysis model 300 of each thread is used in one embodiment of the invention. In another embodiment of the invention, the frequency of the state transitions among the four states of the analysis model 300 is used. For example, in one embodiment of the invention, the frequency is determined from the ratio of the measured number of state transitions and the duration of the measurement period.

The first scenario of active parallel overheads is identified or determined when the frequency of task or job execution for each thread exceeds a threshold in one embodiment of the invention. In one embodiment of the invention, the number of tasks executed by each worker thread is determined. The number of tasks executed by each worker thread is determined by adding the number of tasks that are taken from its local queue and the number of tasks that are taken from another task queue or the global queue. The frequency of task or job execution for each thread is determined by the ratio of the number of tasks executed by each worker thread and the duration of the measurement period.

The number of tasks that are taken from its local queue for each thread is determined from the number of occurrences of the state transition path 312 from the user-code execution state 310 to the local queue lookup state 320 as illustrated in the analysis model 300. The number of tasks that are taken from another task queue or the global queue for each thread is determined from the number of occurrences of the state transitions from the local queue lookup state 320 to the global task searching state 330 and reiterating the global task searching state 330.

When the first scenario of active parallel overheads is identified, a report is sent to the user that the reason for the active parallel overheads is due to each worker thread spending too much of its lifetime taking the task out of the local queue, i.e., the granularity of the tasks of parallel region(s) of the multi-threaded application is too fine.

The second scenario of active parallel overheads is identified or determined when the ratio of the number of tasks that are taken from another task queue or the global queue and the number of tasks that are taken from its local queue for each thread exceeds a threshold. In one embodiment of the invention, the threshold is set as one, i.e., the second scenario occurs when each thread is executing more tasks stolen from other threads than the tasks taken from its local queue.

When the second scenario of active parallel overheads is identified, a report is sent to the user that the reason for the active parallel overheads is due to each worker thread spending too much time looking for a task in another queue or in a global queue, i.e., the parallel region(s) of the multi-threaded application has a linear spawning problem.

The second scenario of inactive parallel overheads is identified or determined when the frequency of state transitions from the global task searching state 330 to the global task searching state 330 and to the waiting state 340 exceeds a particular threshold in one embodiment of the invention. This is illustrated in the analysis model 300 by the state transition path 336 that repeats or reiterates the global task searching state 330 and the state transition path 332 from the global task searching state 330 to the waiting state 340.

When the second scenario of inactive parallel overheads is identified, a report is sent to the user that the reason for the inactive parallel overheads is because the number of tasks of the parallel region(s) is less than the number of available or free worker threads, i.e., insufficient job or task creation of the parallel region(s) of the multi-threaded application.

In one embodiment of the invention, the first scenario of inactive parallel overheads is identified or determined when the frequency of state transitions from the global task searching state 330 to the global task searching state 330 and to the waiting state 340 does not exceed the particular threshold and when the inactive parallel overheads has exceeded a threshold. When the first scenario of inactive parallel overheads is identified, a report is sent to the user that the reason for the active parallel overheads is because one or more worker threads have finished their task but are unable to assist the rest of the worker threads, i.e., excessive waiting of the threads.

When the first scenario of inactive parallel overhead is identified, a report is sent to the user that the reason for the inactive parallel overhead is granularity of parallelism being too coarse. This means that work was divided into chunks that are too large, which limits the number of chunks created, which in turn limits parallelism.

When one or more scenarios of the active and inactive parallel overheads are identified, it allows the correction of the particular parallel region of the multi-threaded application based on the specific report that is generated in one embodiment of the invention. This allows the improvement of the parallel execution of the multi-threaded application. Embodiments of the invention allow users to interpret the results of the analysis model 300 to rectify the error(s) in the multi-threaded application based on the reports or conclusion. In one embodiment of the invention, pointers or suggestions to fix the specific problem(s) or scenario(s) are given in addition with the particular report for each scenario.

The analysis model 300 is based on the worker thread lifecycle states, and not on tasks. This allows both task and non-task based multi-threaded frameworks to be analyzed using a similar approach to determine the cause(s) of the active and/or inactive parallel overheads. In one embodiment of the invention, the analysis model can be integrated into the Intel® Parallel Amplifier software.

The descriptions of the four scenarios of the active and inactive parallel overheads are not meant to be limiting. One of ordinary skill in the relevant art will readily appreciate that other scenarios can be identified without affecting the workings of the invention. Similarly, the four states in the analysis model 300 are not meant to be limiting. One of ordinary skill in the relevant art will readily appreciate that other states can be added without affecting the workings of the invention.

Figure 4:
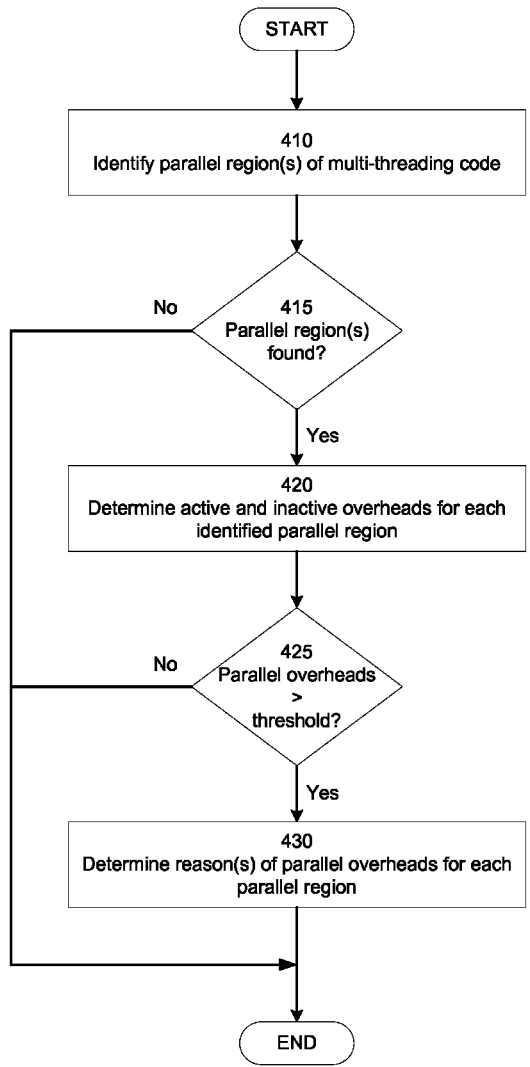
FIG. 4 illustrates a flow chart of the steps to analyze the performance of a multi-threaded application in accordance with one embodiment of the invention.

FIG. 4 illustrates a flow chart 400 of the steps to analyze the performance of a multi-threaded application in accordance with one embodiment of the invention. In step 410, the flow 400 identifies the parallel region(s) of a multi-threaded code or application. In step 415, the flow 400 checks if the parallel region(s) has been found. If yes, the flow 400 goes to step 420 to determine the active and inactive parallel overheads for each identified parallel region. If no, the flow 400 ends.

In step 425, the flow 400 checks if the active and inactive parallel overheads exceed a threshold. In one embodiment of the invention, a single threshold is compared with both the active and inactive parallel overheads. In another embodiment of the invention, a separate threshold is compared with the active and inactive parallel overheads respectively. If yes, the flow 400 goes to step 430 to determine the reason(s) of the parallel overheads for each parallel region of the multi-threaded code or application. If no, the flow 400 ends.

Figure 5A:
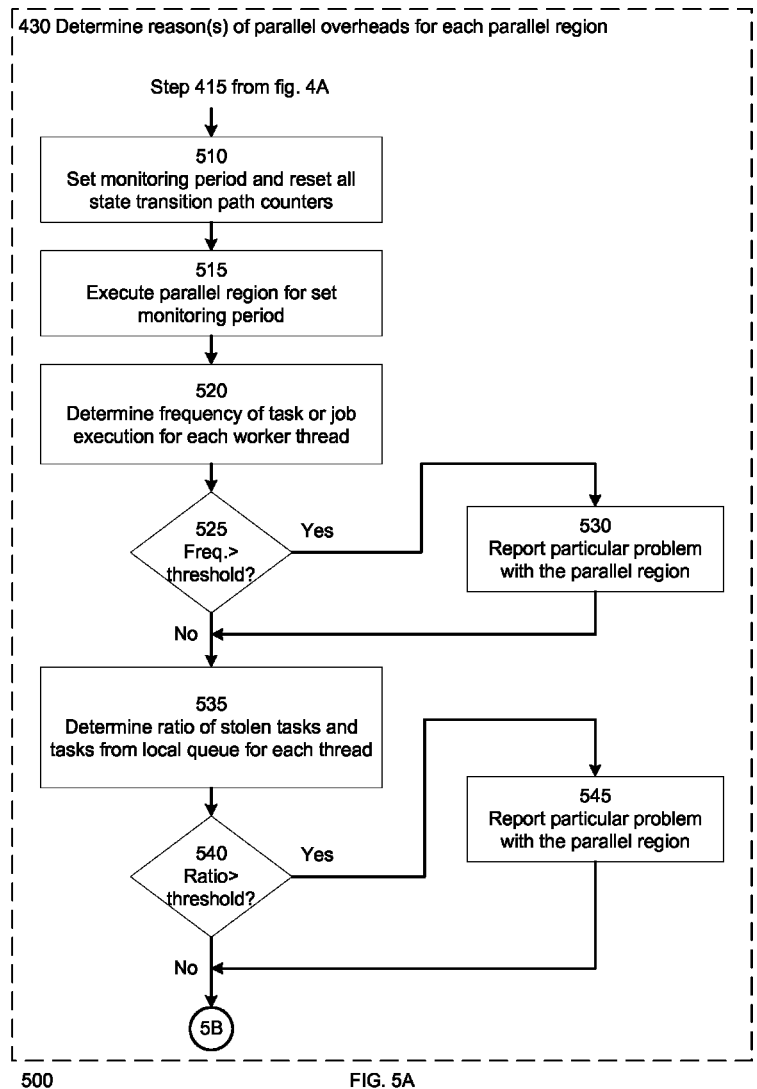
FIG. 5A illustrates a flow chart of the steps to determine the reason(s) of parallel overheads for each parallel region of a multi-threaded application in accordance with one embodiment of the invention.

FIG. 5A illustrates a flow chart 500 of the steps to determine the reason(s) of parallel overheads for each parallel region of a multi-threaded application in accordance with one embodiment of the invention. For clarity of illustration, FIG. 5A is described with reference to FIG. 3.

In step 510, the flow sets a monitoring period and reset all state transition path counters. In one embodiment of the invention, a counter is maintained for each of the state transition paths 312, 314, 316, 322, 332, 334, 336, and 338. In step 515, the flow 500 executes each parallel region of the multi-threaded application for the set monitoring period. During the execution, when each thread of each parallel region of the multi-threaded application transitions among the four states 310, 320, 330, and 340 in the analysis model 300, the respective state transition path counter is incremented.

In step 520, the flow 500 determines the frequency of task or job execution for each worker thread. In step 525, the flow 500 determines if the frequency of task executions for each worker thread exceeds a threshold. For example, in one embodiment of the invention, for TBB parallel overheads to be insignificant compared to the execution of a multi-threaded application, the task may have to be more than 5000 CPU ticks. Assuming that the multi-threaded application is executed on a CPU running at a clock speed of 2 gigahertz (GHz), 400,000 tasks should be executed by each thread per second. The threshold is set at 400,000 tasks per second in one embodiment of the invention.

If the threshold is exceeded in step 525, the flow 500 goes to step 530 to report the particular problem with the parallel region(s). In one embodiment of the invention, step 530 reports that the active parallel overheads is due to each worker thread spending too much of its lifetime taking the task out of the local queue. If the threshold is not exceeded in step 525, the flow 500 goes to step 535.

In step 535, the flow 500 determines the ratio of the number of tasks that are taken from another task queue or the global queue, i.e., stolen tasks, and the number of tasks that are taken from its local queue for each thread. In step 540, the flow 500 determines if the ratio exceeds a threshold. If yes, the flow 500 goes to step 545 to report the particular problem with the parallel region(s). In one embodiment of the invention, step 545 reports that the reason for the active parallel overheads is due to each worker thread spending too much time looking for a task in another task queue or in a global queue. If no, the flow 500 goes to step 5B in FIG. 5B.

Figure 5B:
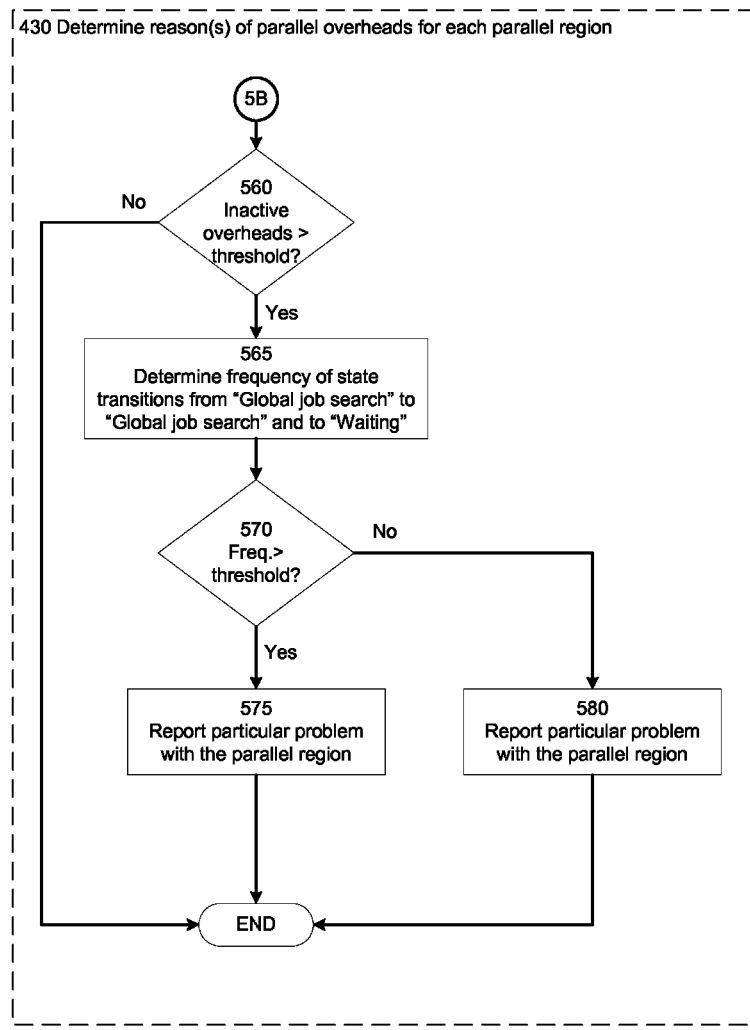
FIG. 5B illustrates a flow chart of the steps to determine the reason(s) of parallel overheads for each parallel region of a multi-threaded application in accordance with one embodiment of the invention.

FIG. 5B illustrates a flow chart 550 of the steps to determine the reason(s) of parallel overheads for each parallel region of a multi-threaded application in accordance with one embodiment of the invention. The flow 550 goes to step 560 from step 5B. In step 560, the flow 550 determines if the inactive parallel overheads exceeds a threshold. If no, the flow 550 ends. If yes, the flow 550 goes to step 565 to determine the frequency of state transitions from the global task searching state 330 to the global task searching state 330 and to the waiting state 340. For example, in one embodiment of the invention, the flow 550 determines the ratio of the sum of the state transition path counters for the state transition paths 336 and 332 and the duration of the set monitoring period. From this ratio, the frequency of state transitions from the global task searching state 330 to the global task searching state 330 and to the waiting state 340 for each thread is obtained.

In step 570, the flow 550 determines if the frequency of state transitions from the global task searching state 330 to the global task searching state 330 and to the waiting state 340 for each worker thread exceeds a threshold. If yes, the flow 550 goes to step 575 to report the particular problem with the parallel region(s) and the flow 550 ends. In one embodiment of the invention, step 575 reports that the reason for the inactive parallel overheads is because the number of tasks of the parallel region(s) is less than the number of available or free worker threads.

If no, the flow 550 goes to step 580 to report the particular problem with the parallel region(s) and the flow 550 ends. In one embodiment of the invention, step 580 reports that the reason for the inactive parallel overheads is because one or more worker threads have finished their task but are unable to assist the rest of the worker threads.

The steps illustrated in FIGS. 4, 5A and 5B are not meant to be limiting. One of ordinary skill in the relevant art will readily appreciate that other sequences of the steps illustrated in FIGS. 4, 5A and 5B can be used without affecting the workings of the invention. For example, in one embodiment of the invention, some of the steps illustrated in FIGS. 4, 5A and 5B are performed in parallel. In one embodiment of the invention, the thresholds required for the steps 425, 525, 540, 565, and 575 can determined based on recommendations from the developers of the particular parallel threading library or multi-threading framework. In another embodiment of the invention, the thresholds required for the steps 425, 525, 540, 565, and 575 are determined based on the costs of performing each of the four states 310, 320, 330, and 340 in the analysis model 300.

Figure 6:
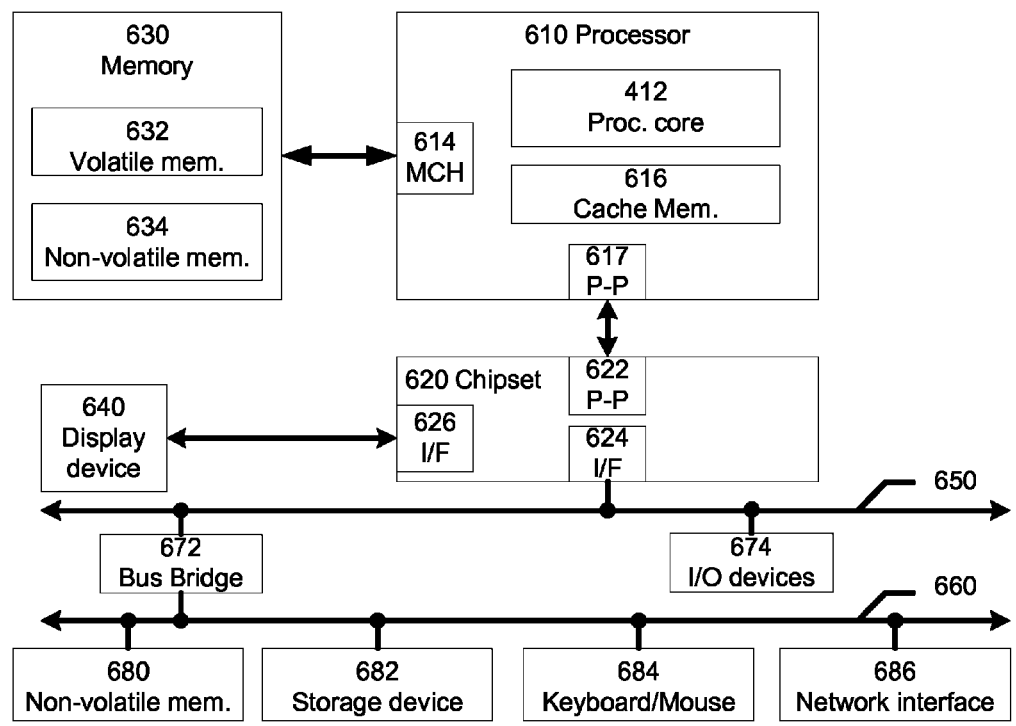
FIG. 6 illustrates a system to implement the methods disclosed herein in accordance with one embodiment of the invention.

FIG. 6 illustrates a system to implement the methods disclosed herein in accordance with one embodiment of the invention. The system 600 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 600 used to implement the methods disclosed herein may be a system on a chip (SOC) system.

The processor 610 has a processing core 612 to execute instructions of the system 600. The processing core 612 includes, but is not limited to, pre-fetch logic to fetch instructions, decode logic to decode the instructions, execution logic to execute instructions and the like. The processor 610 has a cache memory 616 to cache instructions and/or data of the system 600. In another embodiment of the invention, the cache memory 616 includes, but is not limited to, level one, level two and level three, cache memory or any other configuration of the cache memory within the processor 610.

The memory control hub (MCH) 614 performs functions that enable the processor 610 to access and communicate with a memory 630 that includes a volatile memory 632 and/or a non-volatile memory 634. The volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 634 includes, but is not limited to, NAND flash memory, phase change memory (PCM), read only memory (ROM), electrically erasable programmable read only memory (EEPROM), or any other type of non-volatile memory device.

The memory 630 stores information and instructions to be executed by the processor 610. The memory 630 may also stores temporary variables or other intermediate information while the processor 610 is executing instructions. The chipset 620 connects with the processor 610 via Point-to-Point (PtP) interfaces 617 and 622. The chipset 620 enables the processor 610 to connect to other modules in the system 600. In one embodiment of the invention, the interfaces 617 and 622 operate in accordance with a PtP communication protocol such as the Intel® QuickPath Interconnect (QPI) or the like.

The chipset 620 connects to a display device 640 that includes, but is not limited to, liquid crystal display (LCD), cathode ray tube (CRT) display, or any other form of visual display device. In one embodiment of the invention, the processor 610 and the chipset 620 are merged into a SOC. In addition, the chipset 620 connects to one or more buses 650 and 655 that interconnect the various modules 674, 660, 662, 664, and 666. Buses 650 and 655 may be interconnected together via a bus bridge 672 if there is a mismatch in bus speed or communication protocol. The chipset 620 couples with, but is not limited to, a non-volatile memory 660, a storage device(s) 662, a keyboard/mouse 664 and a network interface 666. In one embodiment of the invention, the solid state drive 102 is the storage device 662.

The storage device 662 includes, but is not limited to, a solid state drive, a hard disk drive, an universal serial bus flash memory drive, or any other form of computer data storage medium. The network interface 666 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although the cache memory 616 is depicted as a separate block within the processor 610, the cache memory 616 can be incorporated into the processor core 612 respectively. The system 600 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method of analyzing performance of a multi-threaded application executing on a multi-threading framework comprising:
   determining that parallel overheads of a parallel region of the multi-threaded application exceed a threshold by determining that a frequency of execution of queued tasks for each of one or more worker threads exceeds the threshold, wherein the determining that the frequency of execution of queued tasks for each of one or more worker threads exceeds the threshold comprises determining the frequency of execution of queued tasks for a worker thread based on counting a number of tasks taken from a queue by the worker thread over a monitoring period; and
   determining that one or more causes of the parallel overheads of the parallel region includes that each worker thread is spending too much of its lifetime taking tasks out of a queue, in response to the determination that the parallel overheads of the parallel region of the multi-threaded application exceed the threshold,
   wherein the parallel overheads comprise active parallel overheads and inactive parallel overheads, and wherein determining whether the parallel overheads of the parallel region of the multi-threaded application exceed the threshold comprises determining whether the active parallel overheads and/or the inactive parallel overheads of the parallel region of the multi-threaded application exceed the threshold.

2. The method of claim 1, wherein determining the one or more causes of the parallel overheads of the parallel region comprises:
   executing the parallel region over the monitoring period.

3. The method of claim 1, wherein the multi-threading framework is compliant at least in part with one of Open Multi-Processing (OpenMP), Intel® Threading Building Blocks (TBB), Intel® Cilk++, Intel® C++ for Throughput Computing (Ct), and Microsoft® Parallel Patterns Library (PPL).

4. A method of analyzing performance of a multi-threaded application executing on a multi-threading framework comprising:
   determining that parallel overheads of a parallel region of the multi-threaded application exceed a threshold by determining that a frequency of execution of queued tasks for each of one or more worker threads exceeds the threshold, wherein determining that a frequency of execution of queued tasks for each of one or more worker threads exceeds the threshold comprises determining the frequency of execution of queued tasks for a worker thread based on counting a number of tasks taken from a queue by the worker thread over a monitoring period;
   determining that one or more causes of the parallel overheads of the parallel region includes that each worker thread is spending too much of its lifetime taking tasks out of a queue, in response to the determination that the parallel overheads of the parallel region of the multi-threaded application exceed the threshold;
assigning each of the one or more worker threads to a user-code execution state in response to each thread executing one of one or more tasks of the parallel region;
assigning each of the one or more worker threads to a local queue lookup state in response to each thread looking for a task in a local queue, wherein the task is part of the one or more tasks of the parallel region;
assigning each of the one or more worker threads to a global task searching state in response to each thread looking for another task in another queue or in a global queue, wherein the another task is part of the one or more tasks of the parallel region; and
assigning each of the one or more worker threads to a waiting state in response to each thread being in an idle state.

5. The method of claim 4, further comprising:
determining whether a ratio of execution of the tasks in the local queue and execution of the tasks in the another queue and the global queue exceeds another threshold; and
reporting that each worker thread is spending too much time looking for the another task in the another local queue or looking for the another task in the global queue as one of the one or more causes of the parallel overheads of the parallel region, in response to a determination that the ratio of the execution of the tasks in the local queue and the execution of the tasks in the another queue and the global queue exceeded the another threshold.

6. The method of claim 4, further comprising:
determining whether a frequency of state transitions from the global task searching state to the global task searching state and to the waiting state for each of the one or more worker threads exceeds another threshold;
reporting that the one or more tasks of the parallel region are less than the one or more worker threads as one of the one or more causes of the parallel overheads of the parallel region, in response to a determination that the frequency of the state transitions from the global task searching state to the global task searching state and to the waiting state for each of the one or more worker threads exceeded the another threshold; and
reporting that at least one of the one or more worker threads have finished their task but are unable to assist the rest of the one or more worker threads as one of the one or more causes of the parallel overheads of the parallel region, in response to a determination that the frequency of the state transitions from the global task searching state to the global task searching state and to the waiting state for each of the one or more worker threads does not exceed the another threshold and a determination that inactive parallel overheads of the parallel region of the multi-threaded application exceeded the threshold.

7. An apparatus comprising:
one or more processors;
one or more non-transitory machine-readable media, coupled to the one or more processors, containing one or more machine-readable instructions that, in response to execution on the one or more processors, cause the apparatus to operate a multi-threaded system, wherein the multi-threaded system comprises:
an operating system configured to be operated by the one or more processors to execute a multi-threaded application using a parallel threading library; and
a multi-threaded application performance analyzer configured to be operated by the one or more processors to:
determine that the multi-threaded application comprises a sub-optimal parallel algorithm using a thread life-cycle state machine by determine that a ratio of a number of transitions of threads from a local queue lookup state or a global job searching state to the global job searching state and a number of transitions of threads from an execution state to the local queue lookup state exceeds a first threshold, wherein a thread in a local queue lookup state is in a state to search for a job in a local queue, a thread in a global job searching state is in a state to look for another job in another queue or in a global queue, and a thread in an execution state is in a state to execute on a plurality of jobs of the sub-optimal parallel algorithm;
identify linear spawning as a first one of one or more performance problems of the sub-optimal parallel algorithm, in response to determine that the multi-threaded application comprises a sub-optimal parallel algorithm;
execute the sub-optimal parallel algorithm for a determined period;
determine a sum of a number of transitions of the execution state to the local queue lookup state and a number of transitions of the local queue lookup state or the global job searching state to the global job searching state and repeating the global job searching state;
determine that a ratio of the sum and a duration of the determined period exceeds a second threshold; and
identify that a granularity of the sub-optimal parallel algorithm being too fine as a second one of the one or more performance problems of the sub-optimal parallel algorithm.

8. The apparatus of claim 7, wherein determine that the multi-threaded application comprises the sub-optimal parallel algorithm comprises determine that parallel overheads of the sub-optimal parallel algorithm are comparable to or more than a performance gain of the multi-threaded application.

9. The apparatus of claim 7, wherein the one or more performance problems of the sub-optimal parallel algorithm comprise one or more of sub-optimal granularity, insufficient parallel slackness, and excessive stealing of tasks.

10. The apparatus of claim 7, wherein the multi-threaded application performance analyzer is further configured to be operated by the one or more processors to:
determine whether a number of transitions of the global job searching state to the global job searching state and to a waiting state exceeds a third threshold, wherein a thread in a waiting state is in an idle state;
identify that excessive waiting of the sub-optimal parallel algorithm as a third one of the one or more performance problems of the sub-optimal parallel algorithm responsive to a determination that the number of transitions of the global job searching state to the global job searching state and to the waiting state exceeded the third threshold; and
identify that insufficient job creation of the sub-optimal parallel algorithm as a fourth one of the one or more performance problems of the sub-optimal parallel algorithm responsive to a determination that the number of transitions of the global job searching state to the global job searching state and to the waiting state does not exceed the third threshold and a determination that inactive parallel overheads of the sub-optimal parallel algorithm exceed a fourth threshold.

11. The apparatus of claim 7, wherein the parallel threading library is compliant at least in part with one of Open Multi-Processing (OpenMP), Intel® Threading Building Blocks (TBB), Intel® Cilk++, Intel® C++ for Throughput Computing (Ct), and Microsoft® Parallel Patterns Library (PPL).

12. The apparatus of claim 7, wherein the multi-threaded application performance analyzer is part of the parallel threading library.

13. A machine-readable storage medium having instructions stored thereon which, when executed, cause a processor to:
assign each of a plurality of threads to a respective one of a plurality of states based on a current state of each thread; and
determine one or more performance problems with a parallel region of a multi-threaded application based at least in part on a number of transitions among the plurality of states for each thread, wherein to determine the one or more performance problems, the instructions when executed by the processor cause the processor to:
execute the parallel region of the multi-threaded application for a determined period;
determine a sum of a number of transitions of an execution state to a local queue lookup state and a number of transitions of a local queue lookup state or a global job searching state to a global job searching state, wherein a thread in a local queue lookup state is in a state to search for a job in a local queue, a thread in a global job searching state is in a state to look for another job in another queue or in a global queue, and a thread in an execution state is in a state to execute on a plurality of jobs of the sub-optimal parallel algorithm;
determine that a ratio of the sum and a duration of the determined period exceeds a first threshold; and
identify that a granularity of the sub-optimal parallel algorithm being too fine as a first one of the one or more performance problems of the sub-optimal parallel algorithm.

14. The machine-readable storage medium of claim 13, further having instructions stored thereon which, when executed, cause a processor to:
determine that a ratio of the number of transitions of the local queue lookup state or the global job searching state to the global job searching state and the number of transitions of an execution state to the local queue lookup state exceeds a second threshold, wherein a thread in the execution state is in a current state of inactivity; and
identify that linear spawning of the sub-optimal parallel algorithm as a second one of the one or more performance problems of the sub-optimal parallel algorithm.

15. The machine-readable storage medium of claim 14, further having instructions stored thereon which, when executed, cause a processor to:
determine whether a number of transitions of the global job searching state to the global job searching state and to a waiting state exceeds a third threshold; and
identify that excessive waiting of the parallel region of the multi-threaded application as a third one of the one or more problems of the parallel region of the multi-threaded application responsive to a determination that the number of transitions of the global job searching state to the global job searching state and to the waiting state exceeded the third threshold.

16. The machine-readable storage medium of claim 15, further having instructions stored thereon which, when executed, cause a processor to:
determine whether a number of transitions of the global job searching state to the global job searching state and to the waiting state for each of one or more worker threads exceed another threshold;
identify that excessive waiting of the parallel region of the multi-threaded application as a third one of the one or more problems of the parallel region of the multi-threaded application responsive to a determination that the number of transitions of the global job searching state to the global job searching state and to the waiting state exceeded the third threshold; and
identify that insufficient job creation of the parallel region of the multi-threaded application as a fourth one of the one or more problems of the parallel region of the multi-threaded application responsive to a determination that the number of transitions of the global job searching state to the global job searching state and to the waiting state does not exceed the third threshold and a determination that inactive parallel overheads of the parallel region of the multi-threaded application exceed a fifth threshold.

17. A machine-readable storage medium having instructions stored thereon which, when executed, cause a processor to:
determine that parallel overheads of a parallel region of a multi-threaded application exceed a threshold by determining that a frequency of execution of queued tasks for each of one or more worker threads exceeds the threshold, wherein determining that a frequency of execution of queued tasks for each of one or more worker threads exceeds the threshold comprises determining the frequency of execution of queued tasks for a worker thread based on counting a number of tasks taken from a queue by the worker thread over a monitoring period; and
determine that one or more causes of the parallel overheads of the parallel region includes that each worker thread is spending too much of its lifetime taking tasks out of a queue, in response to the determination that the parallel overheads of the parallel region of the multi-threaded application exceeded the threshold,
wherein the machine-readable storage medium further includes instructions stored thereon which, when executed, cause the processor to:
assign each of the one or more worker threads to a user-code execution state in response to each thread executing one of one or more tasks of the parallel region;
assign each of the one or more worker threads to a local queue lookup state in response to each thread looking for a task in a local queue, wherein the task is part of the one or more tasks of the parallel region;
assign each of the one or more worker threads to a global task searching state in response to each thread looking for another task in another queue or in a global queue, wherein the another task is part of the one or more tasks of the parallel region; and
assign each of the one or more worker threads to a waiting state in response to each thread being in an idle state.

18. The machine-readable storage medium of claim 17, further having instructions stored thereon which, when executed, cause the processor to:
determine whether a ratio of execution of the tasks in the local queue and execution of the tasks in the another queue and the global queue exceeds another threshold; and
report that each worker thread is spending too much time looking for the another task in the another local queue or looking for the another task in the global queue as one of the one or more causes of the parallel overheads of the parallel region, in response to a determination that the ratio of the execution of the tasks in the local queue and the execution of the tasks in the another queue and the global queue exceeded the another threshold.

19. The machine readable storage medium of claim 17, further having instructions stored thereon which, when executed, cause the processor to:

determine whether a frequency of state transitions from the global task searching state to the global task searching state and to the waiting state for each of the one or more worker threads exceeds another threshold;

report that the one or more tasks of the parallel region are less than the one or more worker threads as one of the one or more causes of the parallel overheads of the parallel region, in response to a determination that the frequency of the state transitions from the global task searching state to the global task searching state and to the waiting state for each of the one or more worker threads exceeded the another threshold; and report that at least one of the one or more worker threads have finished their task but are unable to assist the rest of the one or more worker threads as one of the one or more causes of the parallel overheads of the parallel region, in response to a determination that the frequency of the state transitions from the global task searching state to the global task searching state and to the waiting state for each of the one or more worker threads does not exceed the another threshold and a determination that inactive parallel overheads of the parallel region of the multi-threaded application exceeded the threshold.

* * * * *